(12) United States Patent
Cui

(10) Patent No.: US 10,322,916 B2
(45) Date of Patent: Jun. 18, 2019

(54) WINCH

(71) Applicant: Ningbo Lianda Winch Co., Ltd., Ningbo (CN)

(72) Inventor: Xiaojun Cui, Ningbo (CN)

(73) Assignee: Ningbo Lianda Winch Co., Ltd., Ningbo (CN)

( * ) Notice: Subject to any disclaimer, the term of this patent is extended or adjusted under 35 U.S.C. 154(b) by 0 days.

(21) Appl. No.: 15/815,194

(22) Filed: Nov. 16, 2017

(65) Prior Publication Data

US 2019/0092609 A1 Mar. 28, 2019

(30) Foreign Application Priority Data

Sep. 22, 2017 (CN) .......................... 2017 1 0863094

(51) Int. Cl.
*B66D 1/12* (2006.01)
*B60D 1/18* (2006.01)

(52) U.S. Cl.
CPC .............. *B66D 1/12* (2013.01); *B60D 1/185* (2013.01)

(58) Field of Classification Search
CPC . B66D 1/12; B66D 1/185; B66D 1/14; B66D 1/22; B66D 1/00
See application file for complete search history.

(56) References Cited

U.S. PATENT DOCUMENTS

| | | | | |
|---|---|---|---|---|
| 2,583,140 A * | 1/1952 | Else | .................. | B66D 1/12 188/166 |
| 5,663,541 A * | 9/1997 | McGregor, II | .......... | H01H 1/20 200/17 R |
| 7,922,153 B2 * | 4/2011 | Zhou | .................. | B66D 1/22 254/323 |
| D660,254 S * | 5/2012 | Cui | ..................... | D13/159 |
| 8,434,742 B2 * | 5/2013 | Akhavein | ............. | B66D 3/006 254/344 |
| 9,266,702 B2 * | 2/2016 | Fretz | .................. | B66D 1/02 |
| D811,685 S * | 2/2018 | Fretz | .................. | D34/33 |
| 9,902,597 B2 * | 2/2018 | Huang | ................. | B66D 1/14 |
| 9,908,752 B2 * | 3/2018 | Huang | ................. | B66D 1/14 |
| 2007/0221898 A1 * | 9/2007 | Giacomini | ............. | B66D 1/08 254/323 |
| 2008/0000735 A1 * | 1/2008 | Huang | ................. | B60T 13/02 188/171 |
| 2008/0224110 A1 * | 9/2008 | Starks | .................. | B66D 3/20 254/264 |
| 2011/0180770 A1 * | 7/2011 | Karambelas | ............ | B66D 1/12 254/344 |
| 2014/0001427 A1 * | 1/2014 | Fretz | .................. | B66D 1/02 254/342 |

* cited by examiner

*Primary Examiner* — Michael E Gallion
(74) *Attorney, Agent, or Firm* — W&K IP

(57) ABSTRACT

The present disclosure discloses a winch comprising a motor having a rotator, a brush holder assembly electrically coupled to the rotator, and a coil assembly surrounding the rotator, a motor casing covering at least a part of the motor which comprises a plurality of conducting columns electrically coupled to the coil assembly and the brush holder assembly, a driving shaft drivably connected to the motor, a gear reduction unit drivably connected to the driving shaft, a first support frame detachably connected to the motor casing, a second support frame detachably connected to the gear reduction unit, and a winding drum located between the first support frame and the second support frame. The winch as disclosed facilitates mounting and dismounting, and provides improved waterproofness.

1 Claim, 6 Drawing Sheets

WINCH

CROSS-REFERENCE TO RELATED APPLICATIONS

This application claims priority to Chinese Patent Application No. 201710863094.9 with a filing date of Sep. 22, 2017. The content of the aforementioned applications, including any intervening amendments thereto, are incorporated herein by reference.

TECHNICAL FIELD

The present disclosure relates to the field of vehicle accessories, and more particularly, to a winch.

BACKGROUND OF THE PRESENT INVENTION

Winches are devices used for traction, and are mainly used to rescue vehicles in harsh environments. When the vehicle is trapped in muddy or rough terrain and not the wheels are on the ground, the winch can be used to drag the vehicle out by using another object as a fulcrum. The winch can also be used to drag large-size obstacles such as logs. Existing electrical winches are mainly comprised of a motor, a driving shaft, a gear reduction box and a winding drum. The gear reduction box transmits the driving power from the motor to the winding drum so that a substantial traction force can be induced on a steel wire wound around the winding drum for functions of the winch.

Winches are mainly prepared for emergencies so they have to work under various hostile environments. Unexpected failures may frequently happen during use of winches. The structures of existing winches need improvement in ease of maintenance and operation to deal with unexpected failures rapidly. Besides, mechanical components of a winch are subject to water damage in water or rainy weather.

SUMMARY OF PRESENT INVENTION

The present disclosure discloses a winch comprising a motor having a rotator, a brush holder assembly electrically coupled to the rotator, and a coil assembly surrounding the rotator, a motor casing covering at least a part of the motor which comprises a plurality of conducting columns electrically coupled to the coil assembly and the brush holder assembly, a driving shaft drivably connected to the motor, a gear reduction unit drivably connected to the driving shaft, a first support frame detachably connected to the motor casing, a second support frame detachably connected to the gear reduction unit, and a winding drum located between the first support frame and the second support frame.

In some embodiments, the winch further comprises a control unit electrically coupled to the conducting columns.

In some embodiments, the coil assembly comprises a flux coil and a coil casing to receive the flux coil.

In some embodiments, the motor casing comprises four protruding support components within the motor casing to contact and support the coil casing.

In some embodiments, the coil casing comprises a notch on the edge of a first end.

In some embodiments, the coil casing comprises at least one cut to mount to at least one of the support components on the edge of a second end opposite to the first end.

In some embodiments, the coil casing comprises a step component protruding into the interior of the motor casing, and the at least one cut is arranged on the step component.

In some embodiments, the motor casing is mounted onto the first support frame by a plurality of hexagon bolts.

In some embodiments, the plurality of conducting columns protrude from the motor casing through a plurality of mounting holes, a plurality of O-rings, a plurality of sealing rings, a plurality of nuts and a insulating bracket which are arranged on the motor casing.

In some embodiments, the brush holder assembly is arranged within the motor casing with a distance from the first support frame The embodiments as disclosed alleviate at least one problem of the prior arts. The concise structure of the winch provides expedient dismounting and mounting. Waterproofness of the winch is also enhanced by providing the conducting columns on the motor casing.

DESCRIPTION OF THE DRAWINGS

The present invention is illustrated by way of example and not limitation in the figures of the accompanying drawings, in which like references indicate similar elements, and in which.

DETAILED DESCRIPTION OF PREFERRED EMBODIMENTS

Figure 1:
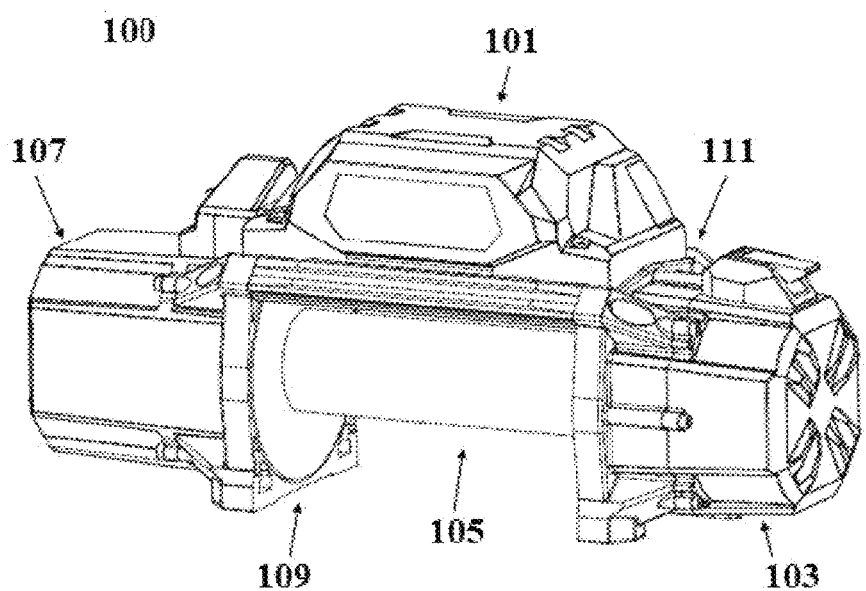
FIG. 1 is a schematic diagram of a winch according to an embodiment.

Various aspects of the illustrative embodiments will be described using terms used by those commonly skilled in the art to convey the substance of their work to other. However, it will be apparent to the skilled in the art that alternate embodiments may be practices with only some of the described aspects. For purposes of explanation, specific number, materials, and configurations are set forth in order to provide a thorough understanding of the illustrative embodiments. However, it will be apparent to one skilled in the art that alternate embodiments may be practices without the specific details. In other instances, well-known features are omitted or simplified in order not to obscure the illustrative embodiments.

Although the terms first, second, third, left, right, upper, lower, etc. may be used herein to describe various elements, these elements should not be limited by these terms. These terms are only used to distinguish one element from another. Terms such as "first," "second," and other numerical terms when used herein do not imply a sequence or order unless clearly indicated by the context. Thus, a first element could be termed a second element, and a left component could be termed a right component without departing from the teachings of the example embodiments. In addition, the term "and/or" may mean "and", "or", "exclusive-or", "one", "some, but not all", "neither", or "both", although the scope of the claimed subject matter is not limited in this respect.

In the following description and/or claims, the terms "comprise" and "include", along with their derivative, may be used and are intended as synonyms for each other.

The terms used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. Furthermore, in the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact with each other. Coupled may mean that two or more elements are in direct physical and/or electrical contact.

However, coupled may also mean that two or more elements may not be in direct contact with each other, but yet may still cooperate and/or interact with each other. For example, "coupled" may mean that two or more elements do not contact each other but are indirectly joined together via another element or intermediate elements.

FIG. 1 is a schematic drawing of a winch 100 according to an embodiment of the present disclosure. The winch 100 comprises a control unit 101 to allow user manipulation of various functions of the winch. The control unit 101 is electrically coupled to other components. The control unit 101 may also provide power supply to the winch 100. The control unit 101 could be installed on top of the winch 100 and supported by the first support frame 109 and the second support frame 111. The shapes of the first support frame 109 and the second support frame 111 can be adapted to the control unit 101. The winch 100 further comprises a motor unit 107 to provide power, a winding drum 105 driven by the motor unit 107, and a gear reduction unit 103 to adjust the rotating speed of the winding drum 105. The winding drum 105 is rotatably connected to the motor unit 107 and the gear reduction unit 103 by a driving shaft 317 (shown in FIG. 3). Cables used to drag the vehicle are wound around the winding drum 105. A first cavity to receive the motor is formed by detachably connecting the motor unit 107 and the first support frame 109. The gear reduction unit 103 and the second support frame 111 are detachably connected to form a second cavity to receive gear reduction mechanisms. The winding drum 105 is arranged between the first support frame 109 and the second support frame 111. The winch 100 can be mounted to the vehicle by the first support frame 109 and the second support frame 111. The cables wound on the winding drum 105 rotate with the winding drum 105. The gear reduction unit 103 comprises a multi-stage planetary wheel component for speed reduction in order to control the rotating speed of the winding drum 105. Multiple work modes, such as a disengaged mode, a high speed mode, and a low speed mode, can be provided.

Figure 2:
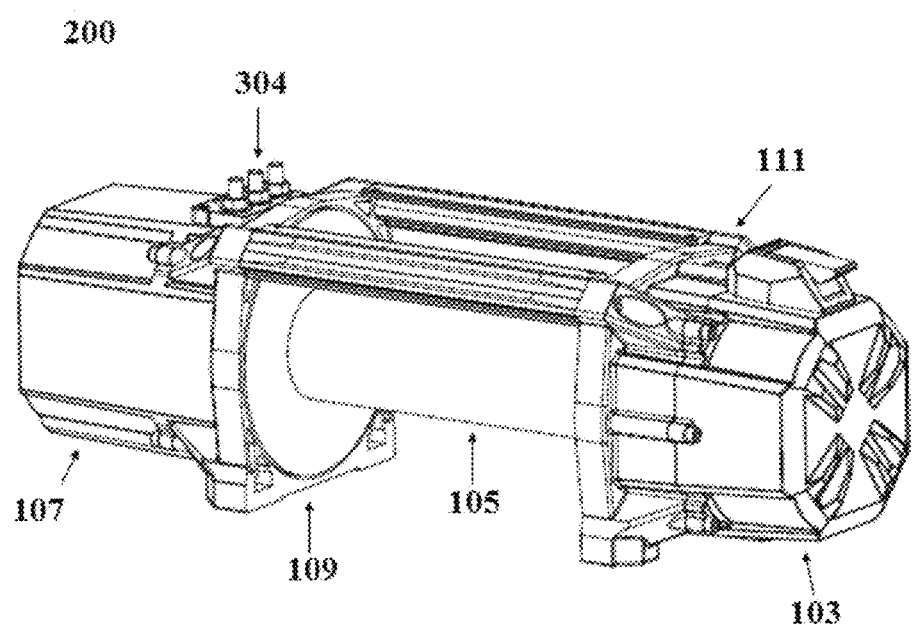
FIG. 2 is a schematic diagram of a winch according to another embodiment.

FIG. 2 shows a winch 200 according to another embodiment of the present disclosure. The difference between the winch 200 and the winch 100 is that the winch 200 comprises no control unit 101. A peripheral control unit 101 can be provided for the winch 200 to allow user customization of control means. In some embodiments, the control unit 101 can be removed from the winch 200 and placed in other locations far away from the winch 200, including the interior or bottom of the vehicle, so that damage to the control unit 101 can be avoided. The winch 200 comprises a plurality of conducting columns 304 to electrically couple to a peripheral or remote control unit 101. Although only three conducting columns 304 are shown, the skilled in the art would anticipate more or less conducting columns 304 are possible.

Figure 3:
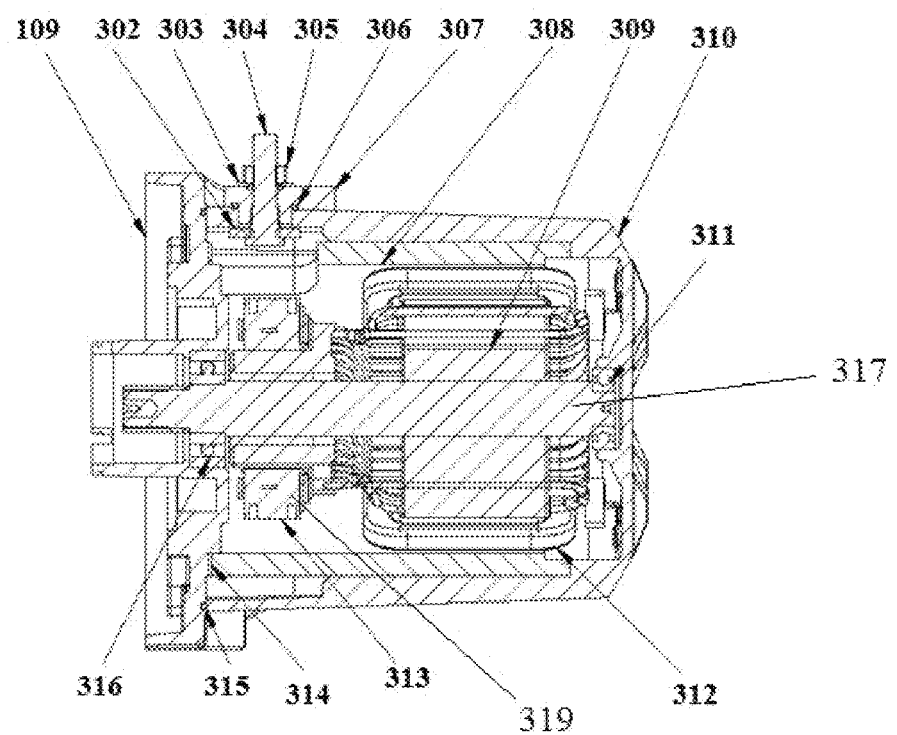
FIG. 3 is a cross-section of a motor of a winch according to an embodiment.
Figure 4:
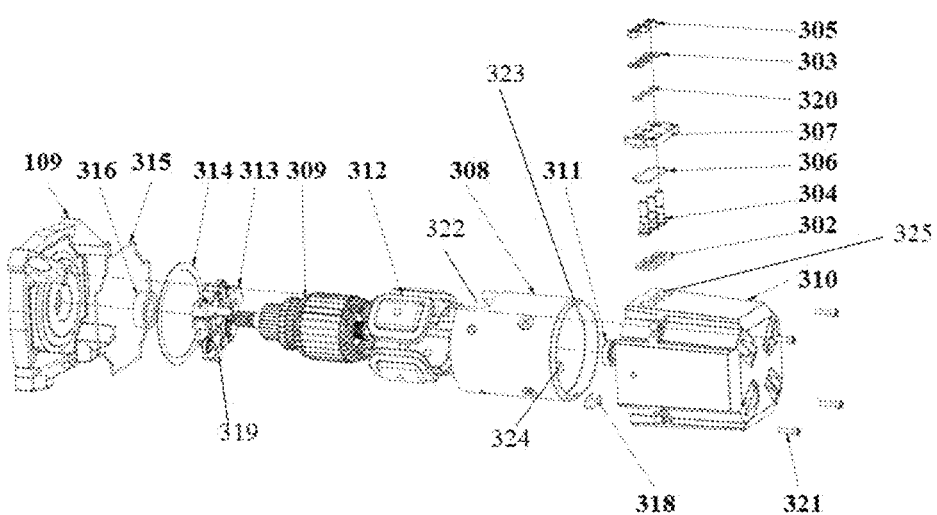
FIG. 4 is an explosive view of a motor of a winch according to an embodiment.

FIGS. 3 and 4 show the motor unit 107. The motor unit 107 comprises a motor casing 310 detachably connected to the first support frame 109. For example, the motor casing 310 can be connected to the first support frame 109 by a plurality of hexagon nuts 321 to form a first cavity to accommodate other components of the motor unit 107. The motor unit 107 has a motor comprising a rotator 309, a brush holder assembly 319 electrically coupled to the rotator 309, and a coil assembly surrounding the rotator 309. The rotator 309 is rotatably mounted in the first cavity by a first bearing component 311 and a second bearing component 316. The rotator 309 can be any existing armatures which produce electromagnetic force with DC or AC current. For example, the first bearing component 311 can be a 6001 type bearing, and the second bearing component 316 can be a 6203 type bearing. The brush holder 313 comprises a plurality of brushes in contact with the rotator 309. Each brush is slidably coupled to the rotator 309 to provide a conductive connection. The brush can be any of a graphite brush, an electrochemical graphite brush, a resin bonded graphite brush, and a metallic graphite brush. Optionally, a first motor end sealing ring 314 and a second motor end sealing ring 315 can be provided at positions where the motor casing 310 and the first support frame 109 make contact. Using two sealing rings can further enhance waterproof capabilities. The coil assembly comprises a flux coil 312 and a coil casing 308. The flux coil 312 is mounted to the coil casing 308 by a plurality of inner hexagon bolts 318. The coil assembly surrounds the rotator 309, and the brush holder assembly is located on one side of the coil assembly. The brush holder assembly 319 is placed on the side which is nearer to the first support frame 109 and is at a distance from the first support frame 109. A notch 322 is provided on the edge of the end of coil casing which is nearer to the brush holder assembly M. The size of the notch 22 is adapted to allow the conducting columns 304 to pass through to electrically couple with brush holder 313 and the flux coil 312. Further, the notch 322 can be used for heat dissipation and therefore, facilitates manual dismounting and mounting of the coil casing 308. At least one cut 323 is provided on the edge of the other end of the coil casing 308 which is opposite to the end which has the notch 2 and is near the brush holder assembly 319. The at least one cut 323 is formed on a step component 324 protruding into the interior of the motor casing 310, i.e., protruding towards a direction leading away from the first support frame 109. The shape of the at least one cut 323 is adapted to support structures within the motor casing so as to mount within the motor casing 310. In the embodiment where the coil casing 308 is cylindrical, the diameter of a circle defined by the step component 324 is less than the diameter of a circle defined by the cross-section of the coil casing 308. The end of the coil casing 308 having the notch 322 is in contact with the first support frame 109, while the end of the coil casing 308 having the step component 324 is in contact with the bottom of the motor casing 310. The coil casing 308 therefore surrounds the brush holder 313, the rotator 309, and the flux coil 312, and provides protection such as waterproofness and A plurality of conducting columns 304 coupled to the control unit are arranged on positions above the motor casing 310 in correspondence with the brush holder 313. The upper portions of the conducting columns 304 protrude from mounting holes 325 opened on the motor casing 310. The lower portions of the conducting columns 304 are in contact with the plastic covers 302 and the insulating bracket 307, so that the conducting columns 304 are insulated from the motor casing 310. A sealing ring 306 is arranged at a position where the insulating bracket 307 contacts with the motor casing 310. A plurality of O-rings 320 and gaskets 303 surrounding the conducting columns 304 are deployed on the insulating bracket 307. The gaskets 303, the sealing rings 306 and the O-rings 320 are all used to provide sealing. The conducting column nuts 305 are used to fix the conducting columns 304 onto the motor casing 310. The conducting columns 304 are for example using conduct wires to electrically couple to the control unit 101 which is within the winch 100 or remote from the winch 200. In another aspect, the conducting columns 304 are electrically coupled to the coil assembly and the brush holder assembly 319 to control their operation and/or connect them to a power source. At least one conducting column 304 is electrically coupled to the brush holder 313, and therefore coupled to the rotator 309. At least one conducting column 304 is coupled to the flux coil 312 to produce electromagnetic fields. Optionally, one conducting column 304 is connected to the brush holder 313 and two conducting columns 304 are connected to the flux coil 312.

The interface between the first support frame 109 and the motor casing 310 is likely to have gaps which are subject to water inflow. Deploying the conducting columns 304 on the motor casing 310 provides better sealing performances for the connection between the first support frame 109 and the motor casing 310. Sealing mechanisms such as the gasket 303, the sealing rings 306, the O-rings 320, and the motor end sealing rings 314, 315 can further enhance the waterproofness of the winch 100, 200. Besides, deploying the conducting column 304 on the motor casing 310 reduces the size of the first support frame to provide a more concise structure of the winch 100, 200.

Figure 5:
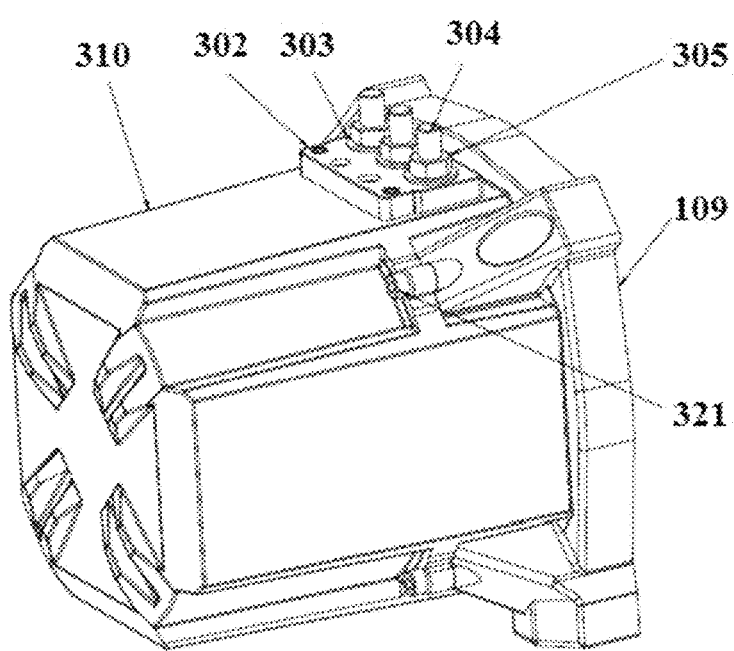
FIG. 5 is a schematic diagram of a motor casing of a winch according to an embodiment.
Figure 6:
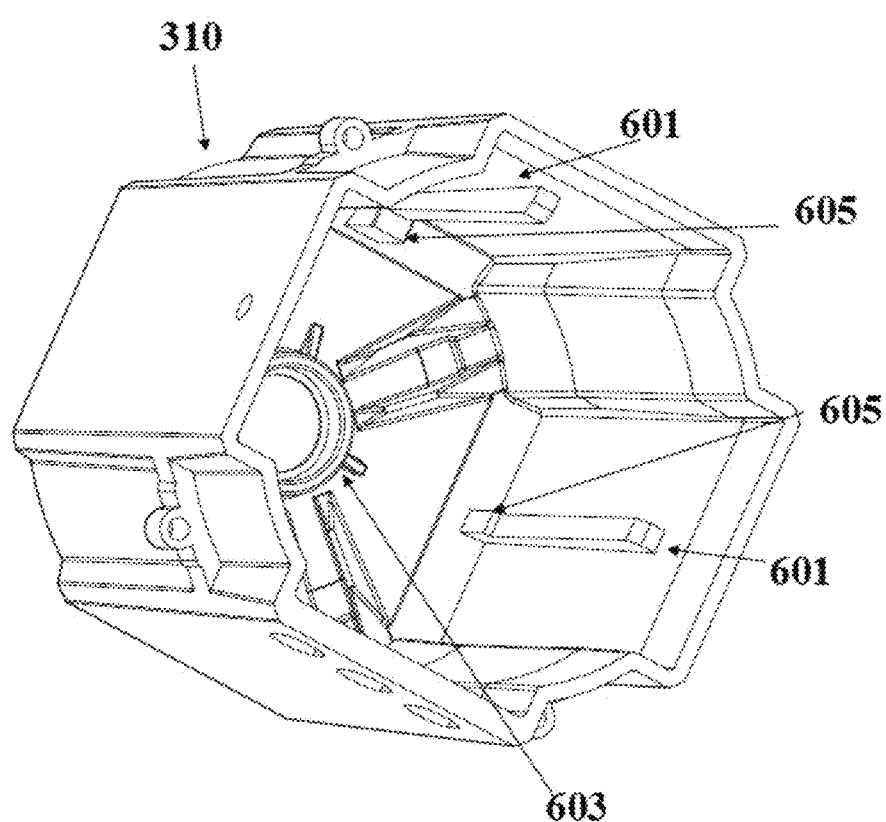
FIG. 6 is a schematic diagram of the inner structures of a motor casing of a winch according to an embodiment.

FIGS. 5 and 6 show a schematic diagram of the motor casing 310. A plurality of protruding support components 601 are arranged in the motor casing 310. As shown in FIG. 6, two pairs of support components 601 are arranged on the inner walls of the motor casing 310. Each pair of support components comprise two support components protruding from two opposite inner walls respectively. The length of each support component 601 is smaller than the length of the motor casing 310. Therefore, the top of the support component 601 is spaced from the edge of the motor casing 310 by a distance. The bottom of the support component 601 has a protruding component 605 which is in correspondence with the cut 323 of the coil casing 308. The protruding component 605 is inserted into a corresponding cut 2 to provide support and limitation to the coil assembly. Using the support component 601 and the protruding component 605 to fix the coil assembly within the motor casing 310 renders dismounting and mounting more convenient compared to using screws and nuts. The rotator 309, the brush holder assembly 319 and the coil assembly can be removed more rapidly for repairs in case of emergencies. A mounting base 603 is comprised in the bottom plate of the motor casing 310 to mount the first bearing component 311 and the driving shaft 317.

Although certain embodiments have been illustrated and described herein for purposes of description, a wide variety of alternate and/or equivalent embodiments or implementations to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof. Particular terms used herein when describing certain feature or aspects should not be taken to imply the terms are redefined to be restricted to any specific feature or aspects with which they are associated. In general, the terms used in the claims should not be construed to limit the invention to specific examples disclosed in the specification, unless the specification explicitly defines such terms. Accordingly, the actual scope of the invention encompasses not only the disclosed examples, but also all equivalent ways of practicing or implementing the invention under the claims.

I claim:
1. A winch, comprising:
   a motor having a rotator, a brush holder assembly electrically coupled to the rotator, and a coil assembly surrounding the rotator,
   a motor casing covering at least a part of the motor, the motor casing comprising a plurality of conducting columns electrically coupled to the coil assembly and the brush holder assembly;
   a driving shaft drivably connected to the motor;
   a gear reduction unit drivably connected to the driving shaft;
   a first support frame detachably connected to the motor casing;
   a second support frame detachably connected to the gear reduction unit; and
   a winding drum located between the first support frame and the second support frame, wherein the winding drum is rotably connected to the motor and the gear reduction unit by the driving shaft;
   wherein the coil assembly comprises a flux coil and a coil casing to receive the flux coil;
   wherein the brush holder assembly comprises a brush holder, and wherein the coil casing surrounds the brush holder.

* * * * *